United States Patent [19]

Caviglia et al.

[11] Patent Number: 4,900,120
[45] Date of Patent: Feb. 13, 1990

[54] DEVICE FOR COUPLING SINGLE-MODE OPTICAL FIBERS

[75] Inventors: Francesco Caviglia; Piergiorgio Ricaldone, both of Turin, Italy

[73] Assignee: Cselt Centro Studi E Laboratori Telecomunicazioni S.P.A., Turin, Italy

[21] Appl. No.: 266,724

[22] Filed: Nov. 3, 1988

[30] Foreign Application Priority Data

Nov. 5, 1987 [IT] Italy ............... 67943 A/87

[51] Int. Cl.$^4$ ............... G02B 6/32
[52] U.S. Cl. ............... 350/96.18; 350/96.21
[58] Field of Search ............... 350/96.15, 96.18, 96.20, 350/96.21, 96.22

[56] References Cited

U.S. PATENT DOCUMENTS

| | | | |
|---|---|---|---|
| 3,829,195 | 8/1974 | Rawson | 350/96.15 X |
| 4,475,788 | 10/1984 | Tomassini et al. | 350/96.20 |
| 4,696,062 | 9/1987 | LaBudde | 350/96.15 X |
| 4,701,011 | 10/1987 | Emkey et al. | 350/96.18 |
| 4,749,250 | 6/1988 | Carter | 350/96.20 |
| 4,842,391 | 6/1989 | Kim et al. | 350/96.18 |

FOREIGN PATENT DOCUMENTS

| | | | |
|---|---|---|---|
| 3323773 | 1/1985 | Fed. Rep. of Germany | 350/96.15 X |
| 243123 | 2/1987 | German Democratic Rep. | 350/96.18 X |
| 58-205108 | 11/1983 | Japan | 350/96.18 X |

Primary Examiner—John D. Lee
Assistant Examiner—Brian M. Healy
Attorney, Agent, or Firm—Herbert Dubno

[57] ABSTRACT

A device for coupling single-mode optical fibers, wherein light radiation outside the fibers is transmitted through a collimated optical beam, obtained by a two-lens array facing the fiber ends. Optimal coupling is obtained by translating a third lens and by rotating a small glass plate placed between the collimating lenses.

11 Claims, 1 Drawing Sheet

DEVICE FOR COUPLING SINGLE-MODE OPTICAL FIBERS

FIELD OF THE INVENTION

The present invention relates to telecommunications systems using light radiation transmitted by optical fibers and, more particularly, to a device for coupling single-mode optical fibers through a collimated beam.

BACKGROUND OF THE INVENTION

Coupling of single-mode optical fibers is of particular interest in applications requiring devices interposed between the fiber ends for processing the optical signal, including modulators, beam splitters, Bragg's cells, etc.

As is known, under these conditions the transmission of the light radiation from a single-mode optical fiber to another involves a number of difficulties if very low coupling losses are desired. That is due to the fact that accepted tolerances in displacement errors are of the order of microns and those allowed in axial misalignment errors are of the order of this degree. Hence the difficulty encountered both in carrying out the correct fiber positioning and in maintaining the proper position is evident.

The solutions used heretofore require the use of coupling devices with high-precision guides, in order to obtain the alignment between lenses and fibers without further adjustments.

According to other solutions, fiber ends to be coupled are positioned with high precision by micromanipulators and then are kept in the selected position with adhesives or solders. These methods still have a number of difficulties in their application owing to adhesive shrinkage during a drying phase, which causes renewed axial displacement and misalignment of the juxtaposed fibers.

The coupling problem between a collimated beam source and a single-mode fiber has already been solved by Newport Corporation, which has presented in its 1985 catalog a device referred to as a "High-Precision Steering Lens Single Mode Fiber Coupler". This device basically consists of a biconcave and a biconvex lens, which are traversed by the collimated beam outgoing from the source. The biconcave lens is used to obtain beam deflection, while the biconvex lens is used to focus the beam on the fiber-end face. The biconcave lens can be translated in a plane perpendicular to the beam, obtaining a corresponding translation of the image focused on the fiber. The ratio between these translations is equal to the ratio between lens focal distances, that is why small image displacements can be obtained through much greater biconcave-lens displacements.

A device of this type along is not able to implement coupling between two fibers. In fact if the two fibers are not well positioned, the beam focused on a fiber does not easily remain within its acceptance angle, even if the core image of the optical fiber is correctly positioned on the other fiber core.

This problem could be solved by having one device of the mentioned type for each fiber. However, the further degree of freedom obtained would be detrimental both to the simplicity of device implementation and to the ease of coupling adjustment.

OBJECT OF THE INVENTION

The object of the invention is to overcome this disadvantage in device for coupling single-mode optical fibers which allows the coupling through a collimated beam keeping the optical losses very low, is easy to implement and is simple to use.

SUMMARY OF THE INVENTION

The present invention provides a device for coupling single-mode optical fibers through a collimated beam, wherein the light radiation outgoing from a first optical fiber is collimated by a first lens, and the collimated beam is focused by a second lens on the end face of a second fiber. According to the invention, between the first and second lenses there are inserted:

a glass plate with plane and parallel surfaces and rotatable around two perpendicular axes in a plane perpendicular to the device optical axis, namely the optical axis formed by a straight line traversing the centers of said first and second collimating lenses: and a lens adapted to be translated in a plane perpendicular to the optical axis above in two orthogonal directions.

SPECIFIC DESCRIPTION

Figure 1:
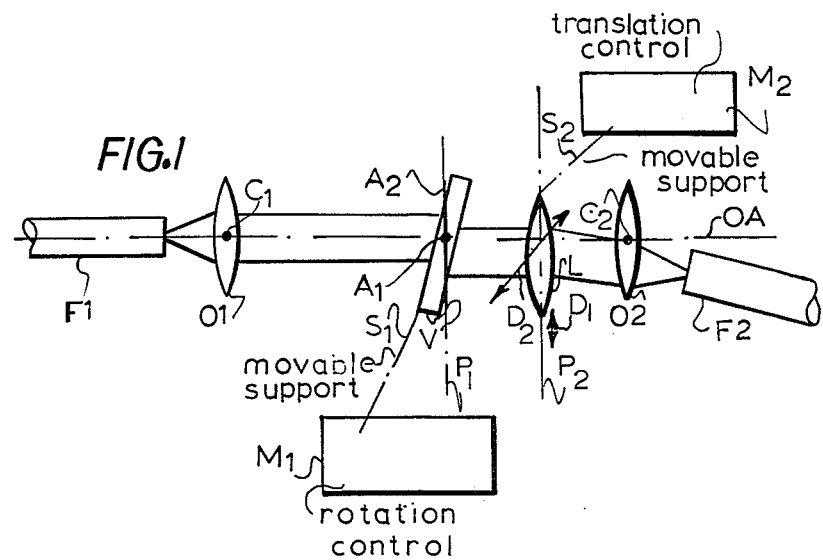
FIG. 1 is a diagrammatic view of an optical coupler in accordance with the present invention wherein the refractive means is constituted by a glass plate which is rotatable, and a lens which is translatable.

In the drawing F1 and F2 denote two single-mode fiber ends to be coupled and 01, 02 denote two lenses of focal length f collimating the beams outgoing from the fibers.

V denotes a glass plate with plane and parallel surfaces, a thickness D an refractive index n, and L denotes a lens with focal length f', which is considerably higher than focal length f of lenses 01 and 02.

Glass plate V can be rotated around two perpendicular axes $A_1$, $A_2$ lying in a plane $P_1$ perpendicular to the optical axis OA of the device, considering as reference optical axis the straight line traversing the centers $C_1$, $C_2$ of lenses 01 and 02. By a slight rotation of the glass plate, a translation of the collimated beam coming from either fiber is caused, obtaining a variation of the beam arrival angle on the end face of the other fiber. This variation is equal, with a good approximation, to the product of the glass plate rotation angle with the quantity $(D/f)(1-1/n)$.

In turn lens L can be translated in a plane $P_2$ perpendicular to the optical axis in two orthogonal directions $D_1$, $D_2$ thus causing an inclination of the collimated beam arriving from a fiber, and hence the translation of the arrival zone of the beam on an end face of the other fiber. The latter translation is equal, with a good approximation, to the product of the translation of L and a quantity $f/f'$.

The glass plate rotation can have as a secondary effect a slight translation of the arrival zone on the fiber end face, as well as the translation of lens L can generate a slight variation in the arrival angle. However the primary effects are prevailing, that is why with the combined action of lens and glass plate and with few successive adjustments the optimal coupling condition is quickly reached.

The glass plate thickness D can be conveniently chosen according to the accepted tolerances in fiber end positioning. If the thickness is insufficient, the glass plate inclination must be too great, hence strong reflection losses are generated. Vice versa, if the thickness is excessive, small glass plate inclinations cause considerable beam translations, rendering the operation critical. Analogous considerations apply to the focal length f' of L: if it is too low L positioning results critical; if it is too high considerable L displacements are required and hence the device becomes more cumbersome. Approximately, f' is to be comprised between 10 and 100 times the focal length f of lenses 01 and 02.

In a practical embodiment of the device a glass plate with D=4 mm, lenses 01 and 02 with f=3 mm and a lens L with f'=200 mm have been advantageously used.

The glass plate inclination is rendered possible by a suitable supporting fork, which holds the glass plate by means of two horizontal pins and can rotate around a vertical axis. As an alternative, the glass plate can be mounted in a ring with a spherical external surface, fastened by a support with a suitable number of bearings.

Lens L can be correctly positioned by fastening it to a ring which can be translated by conventional means, as slides or screws.

To make the device fabrication less expensive, the glass plate and lens supports can be made of a material easy to bend or twist to obtain the optimal coupling condition. The device stability can be increased afterwards by fixing the supports with suitable adhesives. As an alternative, an adhesive or another suitable medium can be used to fasten lens and glass plate temporarily supported and positioned by mobile external supports, belonging to an assembly bench.

The proper sequence of the operations necessary to optimize the coupling is as follows:
  a—positioning of fiber ends by micromanipulators;
  b—fiber fastening by suitable adhesives;
  c—lens and glass plate positioning in order to compensate for undesired displacements occurring during operation b; and
  d—noncritical fastening of lens and glass plate.

Possible optical elements adapted to collect part of the collimated beam or to modulate its intensity can be placed between 01 and V.

In this embodiment, the mutually orthogonal axes $A_1$ and $A_2$ about which the glass plate V can be rotated and lying in the plane $P_1$ perpendicular to the optimal axis OA define axes of rotation for the plate which can be moved about these axes by a movable support $S_1$ controlled by a manipulator $M_1$. The movable support $S_1$ can be adhesively secured in place on a housing of the device (not shown).

Similarly, a support $S_2$ is movable to shift the lens L in translation in the two mutually orthogonal directions $D_1$ and $D_2$ in the plane $P_2$ and can be secured in place. Control of the translation is effected by another manipulator $M_2$ prior to adhesive bending of the support $S_2$ in place.

The glass plate can be omitted and its function carried out by the same lens L, made with a thickness similar to that of the glass plate, which lens ought to be inclined and translated to obtain a correct coupling between the fibers. In this way a simpler device results.

Figure 2:
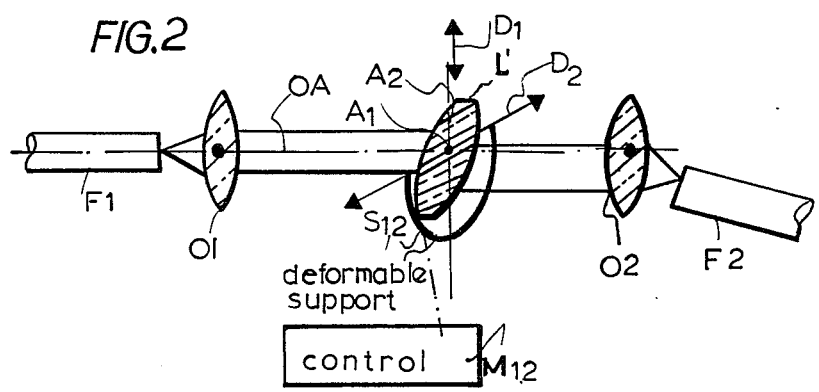
FIG. 2 is a similar diagram illustrating another embodiment of the invention wherein the refractive means is a single lens which is both translatable and rotatable.

In this latter embodiment, shown in FIG. 2, the optical fiber ends are represented at $F_1$ and $F_2$, respectively, the collimating lenses at $O_1$ and $O_2$, respectively, and the optical axis at OA.

The single lens L', having a thickness D corresponding to that of the glass plate, here forms the single element of the refractive means and is displaceable by the manipulator $M_{12}$ in rotation about the mutually orthogonal axes $A_1$, $A_2$ and in translation in the mutually orthogonal directions $D_1$, $D_2$ by definition of a deformable support $S_{12}$ for the lens. Upon deformation of the support $S_{12}$, the support retains its deformed configuration.

We claim:

1. In a device for coupling single mode optical fibers through a collimated beam, wherein the light radiating outgoing from a first optical fiber (F1) is collimated by a first lens (02) on an end face of a second fiber (F2), the improvement wherein between said first and second lenses (01, 02) there are inserted:
  a glass plate (V) with plane and parallel surfaces adapted to be rotated around two perpendicular axes in a plane perpendicular to an optical axis of the device formed by a straight line traversing centers of said first and second collimating lenses (01, 02); and
  a positioning lens (L) adapted to be translated in a plane perpendicular to the optical axis above in to two mutually orthogonal directions.

2. In a device for coupling single mode optical fibers through a collimated beam and having an optical axis, wherein the light radiating outgoing from a first optical fiber (F1) is collimated by a first lens (02) on an end face of a second fiber (F2), the improvement wherein between said first and second lenses (01, 02) there is inserted:
  a positioning lens (L), adapted to be rotated around two mutually perpendicular axes lying in a plane perpendicular to the optical axis of the device and to be translated in a plane perpendicular to the said optical axis in two mutually orthogonal directions.

3. In a device for coupling single mode optical fibers through a collimated beam and having an optical axis, wherein the light radiating outgoing from a first optical fiber (F1) is collimated by a first lens (02) on an end face of a second fiber (F2), the improvement wherein between said first and second lenses (01, 02) there is inserted:
  a positioning lens (L), adapted to be rotated around two mutually perpendicular axes lying in a plane perpendicular to the optical axis of the device and to be translated in a plane perpendicular to the said optical axis in two mutually orthogonal directions, said positioning lens (L) and said glass plate (V) being held by a support made of a material easy to bend and twist to obtain an optimal coupling condition.

4. A device as defined in claim 1 or claim 2 wherein said positioning lens (L) and is positioned by mobile supports outside the device and afterwards fastened by adhesives.

5. A device for optically coupling single-mode optical fibers, comprising:
  a first optical fiber end and a second optical fiber end spaced from but turned toward said first optical fiber end;
  a pair of spaced apart collimating lenses between said optical fiber ends, including a first collimating lens proximal to said first optical fiber end for collimating a light beam outgoing therefrom and a second collimating lens proximal to said second optical fiber end for focusing said light beam on said second optical fiber end; and refractive means located between said collimating lenses, rotatable about two mutually orthogonal axes lying in a plane perpendicular to an optical axis of the device defined by a line connecting centers of said collimating lenses, and translatable in two mutually orthogonal directions in a plane perpendicular to said optical axis.

6. The device defined in claim 5 wherein said refractive means is a single lens capable of both translation in said directions and rotation about said orthogonal axes.

7. The device defined in claim 5 wherein said refractive means includes a lens translatable in said two mutually orthogonal directions in a plane perpendicular to said optical axis.

8. The device defined in claim 7 wherein said refractive means includes a glass plate having planar parallel surfaces and rotatable about said two mutually orthogonal axes lying in a plane perpendicular to said optical axis.

9. The device defined in claim 5 wherein said refractive means includes a glass plate having planar parallel surfaces and rotatable about said two mutually orthogonal axes lying in a plane perpendicular to said optical axis.

10. In a device for coupling single mode optical fibers through a collimated beam, wherein the light radiating outgoing from a first optical fiber (F1) is collimated by a first lens (02) on an end face of a second fiber (F2), the improvement wherein between said first and second lenses (01, 02) there are inserted:

a glass plate (V) with plane and parallel surfaces adapted to be rotated around two perpendicular axes in a plane perpendicular to an optical axis of the device formed by a straight line traversing centers of said first and second collimating lenses (01, 02); and a positioning lens (L) adapted to be translated in a plane perpendicular to the optical axis above in two mutually orthogonal directions, said positioning lens being held by a support made of a material easy to bend and to twist to obtain a optimal coupling condition.

11. In a device for coupling single mode optical fibers through a collimated beam, wherein the light radiating outgoing from a first optical fiber (F1) is collimated by a first lens (02) on an end face of a second fiber (F2), the improvement wherein between said first and second lenses (01, 02) there are inserted:

a glass plate (V) with plane and parallel surfaces adapted to be rotated around two perpendicular axes in a plane perpendicular to an optical axis of the device formed by a straight line traversing centers of said first and second collimating lenses (01, 02); and a positioning lens (L) adapted to be translated in a plane perpendicular to the optical axis above in two mutually orthogonal directions, said glass plate being held by a support made of a material easy to bend and to twist to obtain an optimal coupling condition.

* * * * *